United States Patent [19]

Klein

[11] Patent Number: 4,500,748
[45] Date of Patent: Feb. 19, 1985

[54] FLAME RETARDENT ELECTRICAL CABLE

[75] Inventor: Gary S. Klein, Cleveland, Ohio

[73] Assignee: Eaton Corporation, Cleveland, Ohio

[21] Appl. No.: 483,360

[22] Filed: Apr. 8, 1983

[51] Int. Cl.³ .............................................. H01B 7/28
[52] U.S. Cl. ........................... 174/121 A; 174/121 R
[58] Field of Search ......................... 174/121 R, 121 A

[56] References Cited

U.S. PATENT DOCUMENTS 4,150,249  4/1979  Pedersen ................... 174/121 A X
4,280,225  7/1981  Willis ......................... 174/121 A X
4,412,094  10/1983  Dougherty et al. ....... 174/121 A X

FOREIGN PATENT DOCUMENTS 33568    9/1980  Japan ............................ 174/121 A
2050041  12/1980  United Kingdom .

OTHER PUBLICATIONS

Harbort, Hans; New Flame Retardant Halogen-Free Cables for Nuclear Power Plants; Conference: Cherry Hill, N.J. U.S.A, Proceedings of 29th International Wire & Cable Symposium; pp. 263–267; 11/80.

Mayer, H. A. et al; New Generation of Non-halogenated, Flame Retardant Compounds and Cables; Conference: Cherry Hill, N.J. U.S.A.; Proceedings of 29th International Wire and Cable Symposium; pp. 253–262; 11/80.

Primary Examiner—A. T. Grimley
Assistant Examiner—Morris H. Nimmo
Attorney, Agent, or Firm—C. H. Grace; A. E. Chrow

[57] ABSTRACT

Disclosed is a flame retardant electrical cable able to meet or exceed the flame spread requirements of Underwriters Laboratories Tunnel Flame UL 910 while minimizing or eliminating halogen, particularly fluorine content from the cable by utilizing a first non-fluocarbon polymer and compositions based thereupon for use in making one of the conductor insulation or the protective jacket of the cable and a second non-fluorocarbon polymer or fluorocarbon polymer which may be the same as or different from the first polymer and compositions based thereupon for use in making the other of the conductor insulation or the jacket of the cable where the first and second polymers and compositions based thereupon have a composite Steiner Index of:

$$\frac{(\text{mass of first polymer})(S.I. \text{ of first polymer})}{(\text{total mass of first and second polymers})} +$$

$$\frac{(\text{mass of second polymer})(S.I. \text{ of second polymer})}{(\text{total mass of first and second polymers})} =$$

$$S.I. \text{ (composite)};$$

where:

S.I. is less than about 3500;

mass is the respective number of pounds of the respective polymers included in the cable subjected to the UL 910 Test; and Steiner Index (S.I.) is (A)(B)(C)(1−O.I.) wherein:

(A) is the respective specific heat of the first and second polymers in Btu/1b;

(B) is the respective specific gravity of the first and second polymers;

(C) is the respective percent by molecular weight of non-halogenated elements of the first and second polymers to the respective total molecular weight thereof expressed in decimal form; and O.I. is the respective Limiting Oxygen Index of the first and second polymers under ASTM D2863 expressed in decimal form.

2 Claims, 3 Drawing Figures

FLAME RETARDENT ELECTRICAL CABLE

INTRODUCTION

This invention relates generally to a flame retardant electrical cable and more particularly to a flame retardant electrical cable that is able to meet or exceed the flame spread requirements of Underwriters Laboratories Tunnel Flame Test UL 910 by utilizing one or more melt processible polymeric materials having less fluorocarbon content than heretofore been associated with such cables in the past.

BACKGROUND OF THE INVENTION

It has been the practice in the past in certain instances to use environmental air ducts and plenums to provide a passageway for electrical cables. The flame retardant characteristics of electrical cables conveyed through such ducts and plenums is necessarily extremely critical particularly with respect to flame propagation when exposed to a flame.

One test for evaluating flame propagation of electrical cables for use in ducts and plenums (commonly called "plenum cables") is Underwriters Laboratories Inc., Tunnel Flame Test designated UL 910. The UL 910 Test (also known as the "Steiner"Test) is used as a standard by industry for determining the suitability of particular cables for use in ducts and plenums. The Test, which is described in an Underwriters Laboratories publication titled "Test Method for Fire and Smoke Characteristics of Cables", copyright 1981, 1982, the disclosure of which is incorporated herein by reference, generally involves laying 24 ft. lengths of the cable to be tested adjacent each other on supporting racks within a prescribed test chamber and, after following a prescribed calibration procedure, exposing one end of the cables to an approximate 300,000 BTu methane flame for a prescribed period of time while measuring flame propagation and smoke generation in terms of specific optical density in accordance with the test procedures. Underwriters Laboratories has established that electrical cables suitable for use in ducts and plenums must exhibit a smoke generation characteristic in terms of peak optical density of 0.5 or less and a maximum flame spread of 5 feet or less.

The electrical cable of the present invention is able to meet or exceed the flame spread requirements of the UL 910 Test without having to incorporate the amount of fluorocarbon polymers heretofore thought necessary in the past and, although certain embodiments may not meet the smoke generation requirements of the UL 910 Test, enable their use in many applications in which the prevention of flame propagation is the most important criterion.

Up until the time of the present invention, plenum cable has exclusively utilized fluorocarbon polymeric material such as fluorinated ethylene propylene as a means of providing conductor insulation and jacketing able to meet or exceed the requirements of the UL 910 Test. Such fluorocarbon materials, however, are expensive, and contain substantial amounts of fluorine which in a burning environment are apt to release a complex series of potentially toxic or corrosive gases. Often such cables additionally utilize polymers that contain other halogens such as chlorine in combination with fluorocarbon polymers which in a burning environment and particularly in combination with fluorine are also apt to release a complex series of potentially toxic or corrosive gases.

In view of the above, a need exists for an electrical cable that is able to meet or exceed the flame spread requirements of the UL 910 Test which utilize one or more polymers having a minimum amount of fluorine and other halogens.

SUMMARY OF THE INVENTION

Accordingly, it is an object of the present invention to provide a flexible flame retardant electrical cable.

It is another object of the present invention to provide an inexpensive flame retardant electrical cable that is made from one or more melt processible polymeric materials that reduce the amount of potentially toxic and/or corrosive gases generated when exposed to a burning environment.

It is also another object of the present invention to provide an inexpensive, flexible flame retardant electrical cable that is able to meet or exceed the flame speed requirements of Underwriters Laboratories Tunnel Flame Test UL 910.

DESCRIPTION OF THE PREFERRED EMBODIMENT

Figures 1, 2:
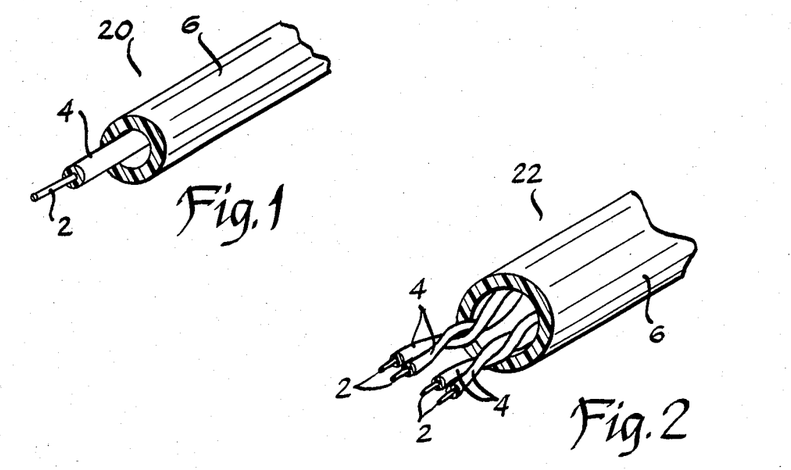
FIG. 1 shows a partial perspective view of an embodiment of an electrical cable 20 made in accordance with the invention.
FIG. 2 shows a partial perspective view of another embodiment of an electrical cable 22 made in accordance with the invention.
Figure 3:
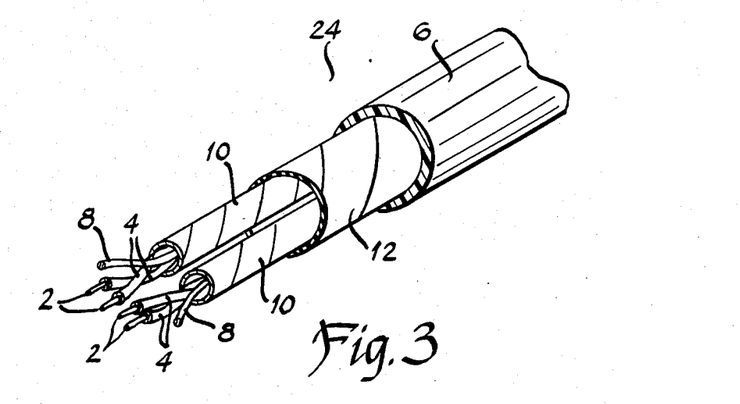
FIG. 3 shows a partial perspective view of another embodiment of an electrical cable 24 made in accordance with the invention.

FIGS. 1-3 show various embodiments of the electrical cable of the invention. FIG. 1 shows an embodiment of the electrical cable of the invention in the form of cable 20. Cable 20 has at least one elongate electrical conductor 2 having a layer of electrical insulation 4 disposed coextensively thereabout. Insulated conductor 2 is disposed within protective jacket 6.

Cable 22 of FIG. 2 illustrates that more than one insulated conductor 2 may be included within jacket 6, such as twisted insulated conductors 2 which are twisted into pairs so as to reduce static interference as is well known to those ordinarily skilled in the art of electrical cable design.

Cable 24 of FIG. 3 illustrates that one or more of insulated conductors 2 may be twisted together with a metallic drain wire 8 with the combination enclosed by a static tape shield 10. Such shields commonly comprise a laminate of aluminum or copper and a polymeric film such as sold by E. I. DuPont De Nemours under the tradename Mylar. The use of such drain wires and static shields in reducing static interference is also well known to those skilled in the art of cable design. Alternatively, the cable of the invention may use a single static shield with or without drain wires about some or all of the insulated conductors 2 disposed within protective jacket 6 or may use an all over shield in conjunction with or without individual static shields with or without drain wires about one or more of insulated conductors 2 disposed within protective jacket 6.

FIG. 3 also shows that a barrier such as flame barrier 12 may be included about some or all of the insulated conductors 2 within jacket 6. The use of flame barriers in electrical cables as a means of delaying the penetration of flame and heat into the insulated conductors is also well known to those ordinarily skilled in the art of making flame retardant electrical cables. Such flame barriers may for example be made from asbestoes silicone materials, impregnated paper, or fiberglass or other suitable material. In some cases, the flame barrier may have at least a portion thereof made from a fluorocarbon such as where a fiberglass substrate is coated with fluorinated ethylene propylene. Although the electrical cable of the invention includes the use of flame or other type barriers in the construction, the amount of fluorocarbon present, if any, is advantageously required to be below a prescribed minimum of about 35% by molecular weight of fluorine to the total molecular weight of the polymer as a means of keeping fluorine content to a minimum as previously described.

Conductor 2 may be a solid or stranded metallic conductor such as copper or other suitable electrically conductive material and may be of a composite construction having two or more layers such as where the outside surface of a copper conductor is coated with a layer of tin to enhance soldering and other characteristics. Conductor 2 may be of any suitable diameter. Commonly conductor 2 is from about 8 AWG to about 32 AWG in size.

Thus, the electrical cable of the invention may be any electrical cable construction from a single insulated conductor disposed within a protective jacket to more complex forms featuring two or more insulative conductors within a protective jacket which may include static shields, drain wires, fire barriers, fillers and other components provided the insulation and jacket are made from materials as hereinafter described and the term "comprising at least one electrical conductor having a layer of electrical insulation disposed thereabout within a protective jacket" includes all of such electrical cables.

In accordance with the invention, insulation 4 and jacket 6 are made from the same or different polymers such that the combination provides a reduced amount of halogens, particularly fluorine, than has heretofore been known in electrical cables able to meet or exceed the flame spread requirements of the UL 910 Tunnel Flame Test. Although the radial thickness of insulation 2 and jacket 6 may vary, insulation 4 is commonly from about 5 mils to about 20 mils and the radial thickness of jacket 6 is commonly from about 15 mils to about 125 mils depending upon the size and voltage characteristics desired for the particular cable.

Understandably, the burning tendency of an electrical cable has been found to increase as the amount of non-halogenated polymeric materials used in the cable materials used in the cable increases in proportion to halogenated polymeric components and thus not only the amount and nature of halogens present but also the mass ratio of halogenated and non-halogenated polymeric materials present in the cable have a bearing upon the ability of the cable to meet or exceed the flame spread requirements of the UL 910 Tunnel Flame Test.

It has been surprisingly discovered that the parameters necessary to design an electrical cable able to meet or exceed the flame spread requirements of the UL 910 Test that enables minimization of the use of halogens and particularly fluorine can be addressed by use of the following formula:

$$\frac{\text{(mass of first polymer)} (S.I. \text{ of first polymer})}{\text{(total mass of first and second polymers)}} +$$

$$\frac{\text{(mass of second polymer)} (S.I. \text{ of second polymer})}{\text{(total mass of first and second polymers)}} =$$

$$S.I. \text{ (composite)};$$

where S.I. (composite) is less than about 3500 and mass is the respective number of pounds of the first and second polymers included in the cable subjected to the UL 910 Test.

In the above equation, the term "first polymer" means a singular or blend of two or more melt processible, non-fluorocarbon, base polymers, and compositions based upon such base polymers. The term "polymer" refers to the base polymer or base polymers which may be incorporated into a composition including fillers, colorants, flame retardant additives, processing aids, crosslinking agent or other additives provided such do not interfere with the physical and electrical characteristics and processibility characteristics desired.

The term "second polymer" means a singular or blend of two or more melt processible, fluorocarbon or non-fluorocarbon, base polymers, and compositions based upon such base polymers. Like the first polymer, the second polymer refers to the base polymer or base polymers which may also be incorporated into a composition such as described above with respect to the first polymer. The first and second polymers may be the same or different and, if one is used to make the conductor insulation, the other is used to make the jacket or vice versa.

The term "S.I." is defined as the Steiner Index for the purpose of this invention. S.I. is determined by the following formula:

$$S.I. \text{ (Steiner Index) is (A) (B) (C) } (1-O.I.);$$

wherein:

(A) is the respective specific heat of the first and second polymers in Btu/lb;

(B) is the respective specific gravity of the first and second polymers;

(C) is the respective percent by molecular weight of non-halogenated elements of the first and second polymers to the respective total molecular weight thereto expressed in decimal form; and O.I. is the respective Limiting Oxygen Index of the first and second polymers under ASTM D2863 expressed in decimal form.

It can thus be seen that the above formulae provide a useful and novel means of selecting polymers by utilizing their known properties of specific heat, density, Oxygen Index and percent of non-halogenated elements in conjunction with their respective mass to provide an electrical cable able to meet or exceed the flame spread requirements of the UL 910 while enabling the minimization of the halogen, particularly fluorine, content of the polymers.

Application of the Steiner Index to various fluorocarbon polymers commonly used in electrical cables able to meet or exceed the flame spread requirements of the UL 910 Test has shown that the Index must not be greater than about 3500 in order for the cable to exhibit a flame spread of five feet or less.

Examples of fluorocarbon polymers commonly used singularly or in combination in the past for the conductor insulation and jacket of electrical cables able to meet or exceed other flame spread requirements of the UL 910 Test are shown in following Table I:

TABLE I

| Polymer | Typical Specific Heat (Btu/lb) | Typical Specific Gravity | Non-Halogen elements (M.W. %) | Typical Limiting Oxygen Index (ASTM D 2683 %) | Steiner Index (S.I.) |
|---|---|---|---|---|---|
| Tefzel | 6700 | 1.7 | 41 | 30 | 3268 |
| Halar | 7607 | 1.68 | 37 | 60 | 1884 |
| FEP | 3300 | 2.15 | 24 | 95 | 85 |
| Kynar | 6400 | 1.75 | 40 | 44 | 2508 |

In above Table I, Tefzel is an ethylene-tetrafluoroethylene polymer sold by E. I. Dupont De Nemours. Halar is an ethylene-chloro-trifluoroethylene polymer sold by Allied Corporation. FEP is a fluoro-ethylene-propylene polymer sold by E. I. Dupont De Nemours. Kynar is a vinylidene fluoride polymer sold by Pennwalt Corporation.

Upon calculation and examination of the Steiner Index of the above described polymers, it was discovered that for FEP, which is known to exhibit the least flame spread in the UL 910 Test when used as both the conductor insulation and jacket, the Index was 85 and that for Tefzel, which is known to meet in certain constructions but exhibits the highest flame spread characteristic under the requirements of the UL 910 Test when used for both the conductor insulation and jacket, the index was 3268. Clearly the discovery of the Steiner Index provides a means of applying the above formula to other melt processible polymers and compositions as a means of minimizing halogen, particularly fluorine, content.

A radiation crosslinkable, non-halogenated, composition which has been found to meet or exceed the flame spread requirements of the UL 910 Test when used to make the jacket of an electrical cable in which the conductor insulation is made from Halar is shown in following Table II:

TABLE II

| Component | Parts by Weight per 100 Part of Vamac |
|---|---|
| Vamac N-123 | 100 |
| 932-CM | 250 |
| Vynathene 902-35 | 20 |
| Stearic acid | 1 |
| Santowhite | 3 |
| Paraffin Wax | 2 |
| HVA-2 | 1 |
| PTMEG (2000 MW) | 3 |

In above Table II, Vamac N-123 is a melt processible ethylene-methyl acrylate copolymer elastomeric sold by E. I. DuPont De Nemours. 932-CM is a hydrated aluminum coated with a proprietary coupling agent sold by Solem Industries. Vynathene 902-35 is a melt processible ethylene-vinyl acetate copolymer sold under the "Vynathene" Trademark by USI. Stearic acid and paraffin wax are processing aids available from numerous chemical supply houses. Santowhite is a hindered phenolic antioxidant sold under the "Santowhite" trademark by Monsanto Company. PTMEG is a 2000 molecular weight poly(tetramethylene-ether) glycol sold by Upjohn Company. HVA-2 is a N, N[1]-m-phenylene-dimaleimide radiation sensitizing agent sold under the HVA-2 trademark by E. I. Dupont De Nemours.

The above composition was milled at about 200° F. and, after compression molding into approximately 0.060 inch slabs at about 300° F. under about 300 psi pressure and irradiation crosslinked by about 5 to about 8 megarads of high energy electrons exhibited the properties shown in following Table III:

TABLE III

| Property | Test Method | Typical Value |
|---|---|---|
| Density (lb/Ft$^3$) | ASTM D 792 | 1.68 |
| Hardness, Shore A (10 Sec) | ASTM D 2240 | 81 |
| Tensile Strength (psi) | ASTM D 638 | 900 |
| Ultimate Elongation (%) | ASTM D 638 | 145 |
| Limiting Oxygen Index (%) | ASTM 2863 | 56.0 |
| Brittle Temperature (°C.) | ASTM D 746 | −10 |
| Specific Heat (BTu/lb) | — | 4448 |
| Non-Halogen Content (%) | — | 100 |

Application to the Steiner Index formula of the specific heat, density, % non-halogen content and Limiting Oxygen Index of the above described composition reveals that the Steiner Index is approximately 3288 which verifies the results of actual testing conducted under the UL 910 Test. It is to be noted that the above described composition contains two melt processible base polymers i.e. Vamac N-123 and Vynathene 902-35 and that neither contain halogen resulting in the non-halogen of the combination being 100%.

In addition to selecting polymers in view of their respective specific heat, density, percent of non-halogenated elements, and Limiting Oxygen Index to provide a Steiner Index of less than about 3500, attention must also be paid to determine other properties such as processibility, physical and wet and dry electricals to be sure that they are suitable for the application intended for the cable.

It is to be understood that the percent non-halogen content by molecular weight to the total molecular weight of the polymer is one of the factors to be used in the Steiner Index formula and relates to the total formulation and that, if used in a composition containing one or more halogenated flame retardants, the halogen content of such flame retardants is included in the computation.

It is also to be understood that polymers used in making the electrical cable of the invention may be solid or may be expanded to provide a cellular material, such as by use of suitable blowing agents and that expanding can effectively reduce the density of the polymer which in turn will lower the Steiner Index.

The invention thus provides for an electrical cable able to meet or exceed the flame spread requirements of the UL 910 Test by use of first and second melt processible polymers, or compositions containing such polymers, respectively for the conductor insulation or the sheath or vice versa, which may be the same or different but one of which is not a fluorocarbon polymer and the other of which is a fluorocarbon or non-fluorocarbon polymer and, where a fluorocarbon polymer, may be a Tefzel, Kynar, FEP or Halar polymer or blends thereof as previously described provided that the Steiner Index calculated accordingly to the formula provided herein is less than about 3500.

In the event that the combination of polymers derived under the formulae provided herein has an average Steiner Index of less than about 3500 but is unable to meet or exceed the smoke generation requirements of the UL 910 Test, means well known to those ordinarily skilled in the art of flame retardant cables, such as filler selection, may be undertaken to reduce the amount of smoke generated so that the cable is able to meet both the flame spread and smoke generation requirements of the UL 910 Test.

In addition to the above, although flame or other type barriers may be used in the electrical cable of the invention, as previously described such barriers are not to incorporate a polymer having more than about 35% by molecular weight of fluorine to the total molecular weight of the polymer since such would enable the incorporation of high fluorine content materials such as Tefzel, Kynar, FEP and Halar to be disposed intermediate the conductor insulation and the sheath and increase the potentially toxic and corrosive gases that may be liberated upon subjecting the cable to burning condition.

What is claimed is:

1. A flame retardant electrical cable comprising at least one elongate electrical conductor having a layer of electrical insulation disposed thereabout within a protective jacket that is able to meet or exeed the flame spread requirements of Underwriters Laboratories Tunnel Flame Test UL 910 as a result of at least one of said conductor insulation and jacket being made from a first melt processible, non-fluorocarbon, polymer and the other of said conductor insulation and jacket being made from a second melt processible polymer selected from the class consisting of fluorocarbon and non-fluorocarbon polymers, said cable satisfying the condition that the composite Steiner Index of the first and second polymers is less than about 3500 according to the formula:

$$\frac{(\text{mass of first polymer}) (S.I. \text{ of first polymer})}{(\text{total mass of first and second polymers})} + $$
$$\frac{(\text{mass of second polymer}) (S.I. \text{ of second polymer})}{(\text{total mass of first and second polymers})} =$$
$$S.I. \text{ (composite)};$$

where S.I. (Steiner Index) is (A) (B) (C) (1−O.I.);
wherein:
mass is the respective number of pounds of the first and second polymers included in the cable subjected to the UL 910 Flame Test;
(A) is the respective specific heat of the first and second polymers in Btu/lb;
(B) is the respective specific gravity of the first and second polymers;
(C) is the respective percent by molecular weight of non-halogenated elements of the first and second polymers to the respective total molecular weight thereof expressed in decimal form; and
O.I. is the respective Limiting Oxygen Index of the first and second polymers under ASTM D2863 expressed in decimal form;
and said cable devoid of any component disposed as a barrier intermediate the conductor insulation and the jacket having at least a portion thereof made from a polymer having more than about 35% by molecular weight of fluorine to the total molecular weight of the polymer.

2. The cable of claim 1 wherein at least one of said first and second polymer is an expanded polymer.

* * * * *

REEXAMINATION CERTIFICATE (2833rd)

United States Patent [19]
Klein et al.

[11] B1 4,500,748
[45] Certificate Issued Apr. 9, 1996

[54] FLAME RETARDANT ELECTRICAL CABLE

[75] Inventors: Gary S. Klein, Cleveland; Vijayraj M. Kotian, Hudson, both of Ohio

[73] Assignee: The Furon Company, Laguna Niguel, Calif.

Reexamination Request:
No. 90/003,395, Apr. 13, 1994

Reexamination Certificate for:
Patent No.: 4,500,748
Issued: Feb. 19, 1985
Appl. No.: 483,360
Filed: Apr. 8, 1983

Related U.S. Application Data

[63] Continuation-in-part of Ser. No. 381,235, May 24, 1982, Pat. No. 4,456,654.

[51] Int. Cl.$^6$ ................................................ H01B 7/28
[52] U.S. Cl. ................................ 174/121 A; 174/121 R

[56] References Cited

U.S. PATENT DOCUMENTS

| | | | |
|---|---|---|---|
| 4,150,249 | 4/1979 | Pedersen | 174/121 A |
| 4,280,225 | 7/1981 | Willis | 174/121 A |
| 4,412,094 | 10/1983 | Dougherty et al. | 174/121 A |
| 4,456,654 | 6/1984 | Kotian | 428/383 |

FOREIGN PATENT DOCUMENTS

| | | | |
|---|---|---|---|
| 0004017A1 | 2/1979 | European Pat. Off. | |
| 25 18 621 | 10/1976 | Germany | |
| 147799 | 4/1981 | Germany | |
| 33568 | 9/1980 | Japan | 174/121 A |
| 2050041 | 12/1980 | United Kingdom | |

OTHER PUBLICATIONS

Test Method for Fire and Smoke Characteristics of Cables; Standard for Safety: Underwriters Laboratories Inc; UL910; Nov. 20, 1981 and First Revision Apr. 30, 1982.
Harbort, Hans; New Flame Retardant Halogen–Free Cables for Nuclear Power Plants; Conference: Cherry Hill, N.J. U.S.A.; Proceedings of 29th International Wire & Cable Symposium; pp. 263–267; Nov. 1980.
Mayer, H. A. et al; New Generation of Non–hologenated, Flame Retardant Compounds and Cables; Conference: Cherry Hill, N.J. U.S.A.; Proceedings of 29th International Wire & Cable Symposium; pp. 253–262; Nov. 1980.

*Primary Examiner*—Morris H. Nimmo

[57] ABSTRACT

Disclosed is a flame retardant electrical cable able to meet or exceed the flame spread requirements of Underwriters Laboratories Tunnel Flame UL 910 while minimizing or eliminating halogen, particularly fluorine content from the cable by utilizing a first non-fluorocarbon polymer and compositions based thereupon for use in making one of the conductor insulation or the protective jacket of the cable and a second non-fluorocarbon polymer or fluorocarbon polymer which may be the same as or different from the first polymer and compositions based thereupon for use in making the other of the conductor insulation or the jacket of the cable where the first and second polymers and compositions based thereupon have a composite Steiner Index of:

$$\frac{(\text{mass of first polymer})(S.I. \text{ of first polymer})}{(\text{total mass of first and second polymers})} +$$

$$\frac{(\text{mass of second polymer})(S.I. \text{ of second polymer})}{(\text{total mass of first and second polymers})} =$$

S.I. (composite):

where:
S.I. is less than about 3500;
mass is the respective number of pounds of the respective polymers included in the cable subjected to the UL 910 Test; and
Steiner Index (S.I.) is (A)(B)(C)(1—O.I) wherein:
  (A) is the respective specific heat of the first and second polymers in Btu/lb;
  (B) is the respective specific gravity of the first and second polymers;
  (C) is the respective percent by molecular weight of non-halogenated elements of the first and second polymers to the respective total molecular weight thereof expressed in decimal form; and
  O.I. is the respective Limiting Oxygen Index of the first and second polymers under ASTM D2863 expressed in decimal form.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, first sentence, after title:

*This is a continuation-in-part of application Ser. No. 381,235, filed May 24, 1982, and now issued as U.S. Pat. No. 4,456.654.*

AS A RESULT OF REEXAMINATION, IT HAS BEEN DETERMINED THAT:

The patentability of claims 1 and 2 are confirmed.

* * * * *

REEXAMINATION CERTIFICATE (3198th)

United States Patent [19]
Klein et al.

[11] B2 4,500,748
[45] Certificate Issued  May 20, 1997

[54] FLAME RETARDANT ELECTRICAL CABLE

[75] Inventors: Gary S. Klein, Cleveland; Vijayraj M. Kotian, Hudson, both of Ohio

[73] Assignee: Furon Company, Laguna Niguel, Calif.

Reexamination Request:
No. 90/004,209, Apr. 4, 1996

Reexamination Certificate for:
Patent No.: 4,500,748
Issued: Feb. 19, 1985
Appl. No.: 483,360
Filed: Apr. 8, 1983

Reexamination Certificate B1 4,500,748 issued Apr. 9, 1996

Related U.S. Application Data

[63] Continuation-in-part of Ser. No. 381,235, May 24, 1982, Pat. No. 4,456,654.
[51] Int. Cl.$^6$ ...................................................... H01B 7/28
[52] U.S. Cl. ................................. 174/121 A; 174/121 R
[58] Field of Search ........................... 174/121 A, 121 R, 174/110 F, 110 PM, 113 R

[56] References Cited

U.S. PATENT DOCUMENTS

| | | | |
|---|---|---|---|
| 2,953,551 | 9/1960 | White | 260/86.7 |
| 3,424,631 | 1/1969 | Peacock | 156/51 |
| 3,553,348 | 1/1971 | Betts | 174/110 |
| 3,802,913 | 4/1974 | Mackenzie, Jr. | 117/232 |

(List continued on next page.)

FOREIGN PATENT DOCUMENTS

| | | |
|---|---|---|
| 0004017A1 | 2/1979 | European Pat. Off. . |
| 2518621 | 10/1976 | Germany . |
| 147799 | 4/1981 | Germany . |

OTHER PUBLICATIONS

Harbot, Hans, "New Flame Retardant Halogen–Free Cables for Nuclear Power Plants"; Conference: Cherry Hill, New Jersey, USA, Proceedings of 29th International Wire & Cable Symposium, pp. 263–267, Nov. 1980.

(List continued on next page.)

*Primary Examiner*—Kristine Kincaid

[57] ABSTRACT

Disclosed is a flame retardant electrical cable able to meet or exceed the flame spread requirements of Underwriters Laboratories Tunnel Flame UL 910 while minimizing or eliminating halogen, particularly fluorine content from the cable by utilizing a first non-fluocarbon polymer and compositions based thereupon for use in making one of the conductor insulation or the protective jacket of the cable and a second non-fluorocarbon polymer or fluorocarbon polymer which may be the same as or different from the first polymer and compositions based thereupon for use in making the other of the conductor insulation or the jacket of the cable where the first and second polymers and compositions based thereupon have a composite Steiner Index of:

$$\frac{(\text{mass of first polymer})(S.I. \text{ of first polymer})}{(\text{total mass of first and second polymers})} +$$

$$\frac{(\text{mass of second polymer})(S.I. \text{ of second polymer})}{(\text{total mass of first and second polymers})} =$$

$$S.I. \text{ (composite):}$$

where:
S.I. is less than about 3500;
mass is the respective number of pounds of the respective polymers included in the cable subjected to the UL 910 Test; and
Steiner Index (S.I.) is (A)(B)(C)(1—O.I.) wherein:
(A) is the respective specific heat of the first and second polymers in Btu/lb;
(B) is the respective specific gravity of the first and second polymers;
(C) is the respective percent by molecular weight of non-halogenated elements of the first and second polymers to the respective total molecular weight thereof expressed in decimal form; and
O.I. is the respective Limiting Oxygen Index of the first and second polymers under ASTM D2863 expressed in decimal form.

U.S. PATENT DOCUMENTS

| | | | |
|---|---|---|---|
| 3,922,442 | 11/1975 | North et al. | 428/447 |
| 4,020,214 | 4/1977 | Mackenzie, Jr. | 428/389 |
| 4,150,249 | 4/1979 | Pedersen | 174/36 |
| 4,243,579 | 1/1981 | Keogh | 260/45.7 |
| 4,260,661 | 4/1981 | Walters et al. | 428/389 |
| 4,280,225 | 7/1981 | Willis | 455/55 |
| 4,349,605 | 9/1982 | Biggs et al. | 428/389 |
| 4,370,076 | 1/1983 | Sullivan et al. | 405/132 |
| 4,412,094 | 10/1983 | Dougherty et al. | 174/110 F |
| 4,456,654 | 6/1984 | Kotian | 428/383 |

OTHER PUBLICATIONS

Mayer, H.A. et al., "New Generation of Nonhalogenated Flame Retardant Compounds and Cables"; Conference: Cherry Hill, N.J., U.S.A., Proceedings of 29th International Wire & Cable Symposium, pp. 253–262, Nov. 1980.

Hagman et al., "Ethylene/Acrylic Elastomers", E.I. Du Pont De Nemours & Co., Bulletin EA–000.2, Reprinted from Rubber Age, May 1976.

Abell, "Vamac N-123", E.I. Du Pont De Nemours & Co., EA-220. N-123.

Boyce, "Flame Retardance in Mineral-Filled Compounds of Vamac", E. I. Du Pont & Co., EA-520.2.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *